Jan. 5, 1954     I. MYER     2,664,802
AUTOMATIC ROW CULTIVATOR
Filed Nov. 27, 1950     2 Sheets-Sheet 1
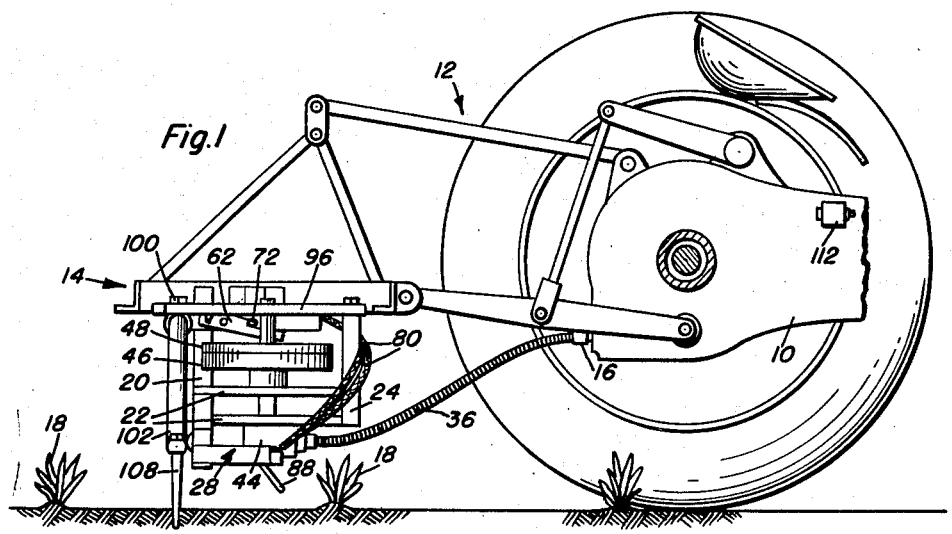
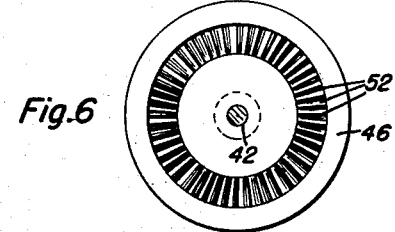
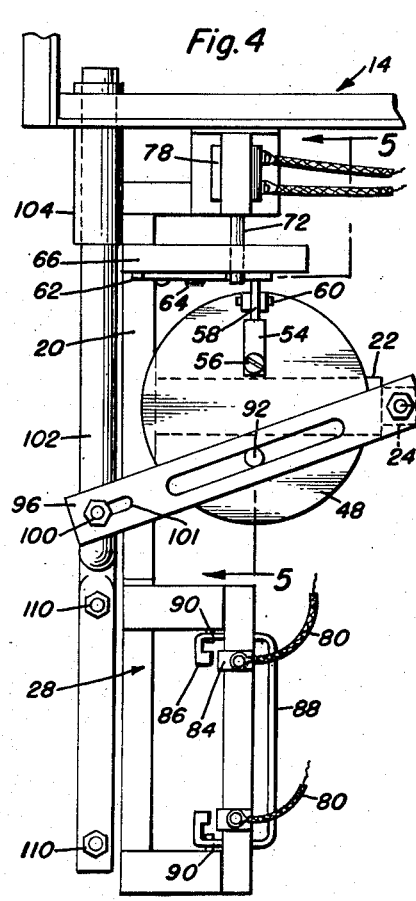
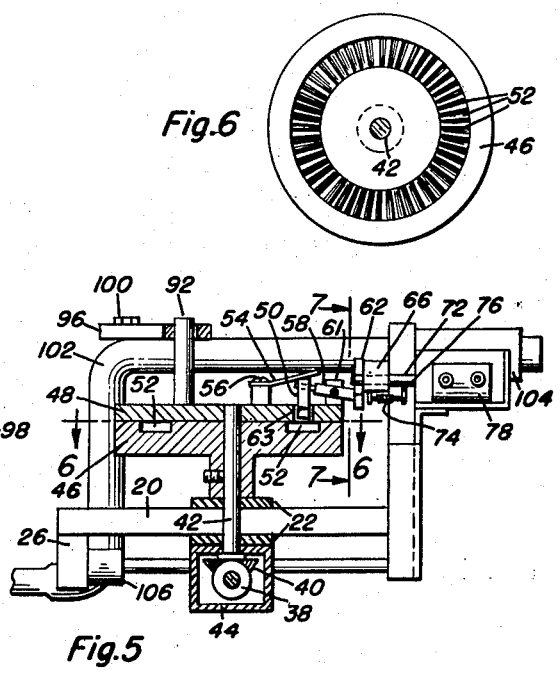
Inventor
Ira Myer
By Clarence A. O'Brien
and Harvey B. Jacobson
Attorneys Jan. 5, 1954
I. MYER
2,664,802
AUTOMATIC ROW CULTIVATOR
Filed Nov. 27, 1950
2 Sheets-Sheet 2
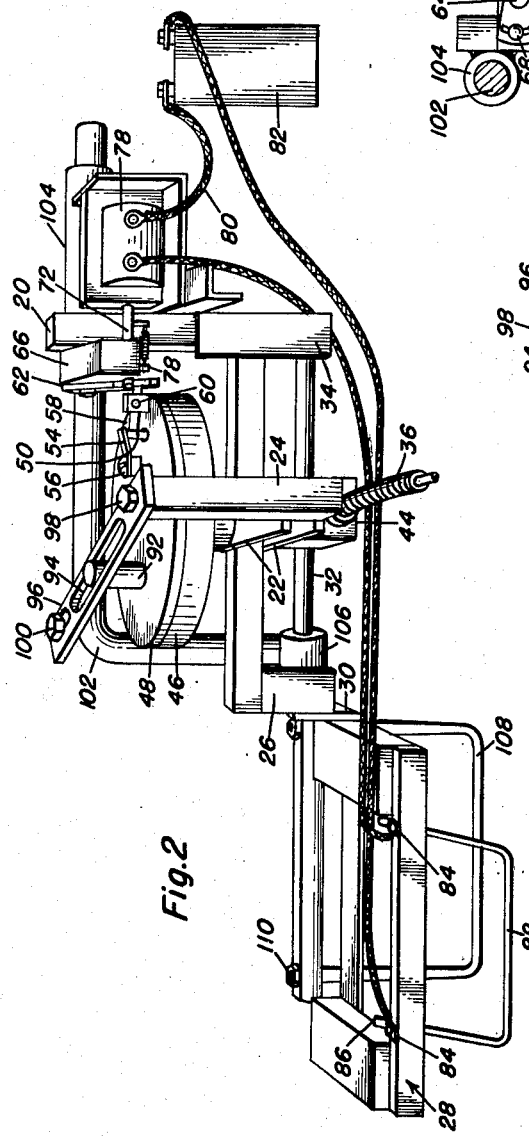
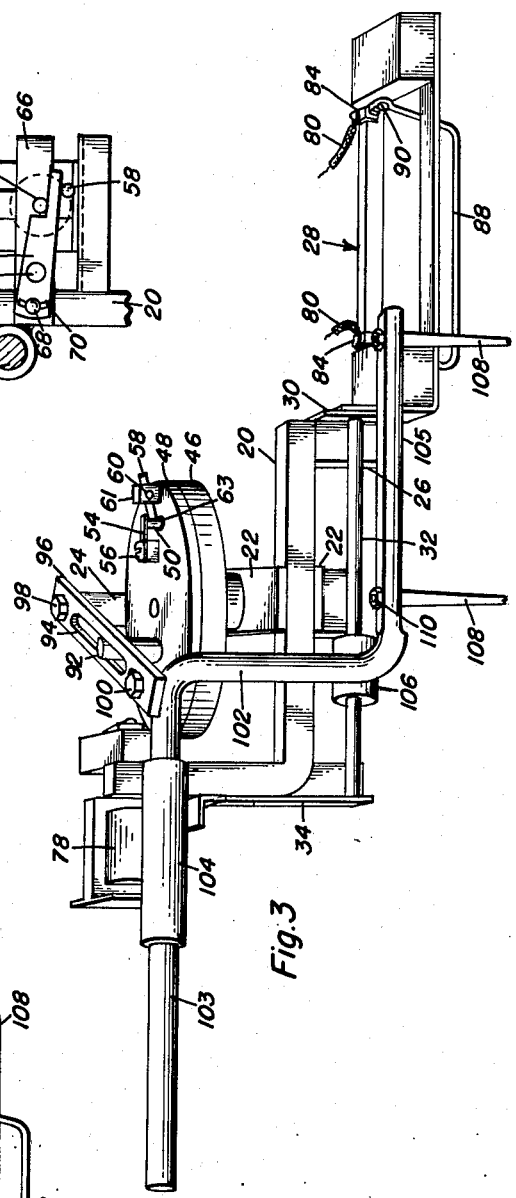
Inventor
Ira Myer
By *Clarence A. O'Brien
and Harvey B. Jacobson*
Attorneys Patented Jan. 5, 1954

2,664,802

UNITED STATES PATENT OFFICE 2,664,802

AUTOMATIC ROW CULTIVATOR

Ira Myer, Ephrata, Pa.

Application November 27, 1950, Serial No. 197,733

6 Claims. (Cl. 97—18)

This invention relates generally to cultivating machines and more particularly to a cultivating machine designed to be moved along a row of plants, the earth-working tool being periodically shiftable transversely of the machine and transversely of the said row of plants so as to cultivate the soil between the plants in the row without unduly disturbing the plants, the device being also suitable for use as a row crop thinner, since it is adapted to remove certain of the plants in a row of plants which is too thick for proper growth.

A primary object of the invention is to carry out the functions indicated in the preceding paragraph, that is, cultivation between the plants in a row of plants which has previously been thinned or space-planted and, alternatively, cultivation and thinning of plants from a row in which the plants have been too thickly seeded for maximum production.

Another object of this invention is to provide a device of the character mentioned above which will not injure the plants remaining in the row, the device being equipped with a light weight trigger or switch operator which merely requires closing of an electrical circuit and, therefore, can be extremely light and easily operated so that the leaves of the plants can actuate the same without injury to the leaves.

Another object of this invention is to provide a device of the character mentioned above which is ideally adapted for mounting on a tractor having a power take-off.

Another object of this invention is to provide a device of this character wherein the transverse movement of the ground working tool is very rapid but accomplished without undue jarring of the device, so that upkeep and the repair of the device are minimized.

A last object to be mentioned specifically is to provide a device of this character which is relatively inexpensive and practicable to manufacture, which is adaptable for use under many varying conditions, which is safe as well as simple and convenient to operate, and which will give generally efficient and durable service.

With these and other objects definitely in view, this invention resides in certain novel features of construction, combination and arrangement of elements and portions as will be hereinafter described in detail in the specification, particularly pointed out in the appended claims, and illustrated in the accompanying drawings which form a material part of this application, and in which:

Figure 1 is a side elevational view of the assembled machine, shown in conjunction with a tractor having a power take-off, the latter being shown fragmentarily and somewhat diagrammatically;

Figure 2 is a view of the assembled machine, removed from the tractor and with certain portions of the supporting frame also removed, the view being in perspective and illustrating the different parts in positions assumed thereby when the soil-working tool is extended or in operative position, the part hereinafter referred to as the arm being latched in depressed position so that the spring-pressed locking pin is withdrawn and the top disk is freed from the driving disk;

Figure 3 is a view of the structure shown in Figure 2, the soil-working tool being withdrawn and the other elements being in corresponding position, this figure being also in perspective, but showing the device as viewed from the opposite side;

Figure 4 is a top plan view showing the elements in substantially the same position as indicated in Figure 2;

Figure 5 is a vertical sectional view taken substantially on the irregular section line 5—5 in Figure 4;

Figure 6 is a horizontal sectional view taken substantially on the line 6—6 of Figure 5; and Figure 7 is a vertical sectional view taken substantially on the line 7—7 in Figure 5.

Similar characters of reference designate similar or identical elements and portions throughout the specification and throughout the different views of the drawings.

Referring now to the drawings in detail, this invention is adapted to be used in an environment which will ordinarily include a tractor such as that diagrammatically illustrated in Figure 1, having a body 10, an implement lift assembly indicated at 12, and a frame carried by said implement lift and indicated at 14, together with a power take-off diagrammatically indicated at 16 and, of course, a row of plants wherein the individual plants are indicated at 18.

The frame of the device includes a sturdy angle member 20 having a vertical and a horizontal portion, this member being possibly best illustrated in Figure 3. The angle member 20 carries a pair of vertically spaced plates 22 which may be welded to the angle member 20 and which comprise simple bearings for the shaft 42 mentioned hereinafter. An upright beam 24 is rigidly secured to the outer end portions of the plates 22, that is, the ends of the plates remote from the angle member 20, while a shorter beam or block 26 is rigidly secured in depending relation on the outer end of the horizontal portion of the angle member 20. The beam or block 26 supports a sub-frame indicated at 28, this sub-frame including a vertical plate 30 which is directly connected to the block 26, as by welding, and a guide bar 32 is rigidly secured to and between the vertical plate 30 and an angle plate 34 which is rigidly secured, as best indicated in Figure 3, to the vertical portion of the angle member 20. It should be stressed that the above described frame elements may be changed considerably in the mass production of this machine, the drawings being properly considered as merely illustrative of suitable means for supporting the working elements of the invention.

A flexible drive cable assembly 36 transmits rotary power from the power take-off 16 of the tractor to a bevel gear 38, engaging another bevel gear 40 on the lower end of the vertical drive shaft 42, the gears 38 and 40 being housed in a casing 44 mounted upon the lowermost of the plates 22. The upper end of the drive shaft 42 is coaxially arranged with regard to the driving disk 46 and the driven disk 48, the driving disk being rigidly secured to the shaft 42, while the driven disk is free to rotate on this shaft, except when the disks are connected by the locking pin 50 which, when depressed, engages one of the notches 52 arranged in a circle on the upper surface of the driving disk 46, as best illustrated in Figures 5 and 6. The locking pin 50 is spring-pressed into depressed position by a leaf spring 54 supported on the driven disk 48, as indicated at 56.

A lever 58 is pivoted as at 60 on upstanding bracket structure 61 carried on the surface of the driven disk 48. This lever 58 carries the locking pin 50, the locking pin being understood as extending through an aperture 63 in the driven disk. An arm 62 is pivoted as indicated at 64 upon a block 66 which is rigidly secured to an upper end portion of the angle member 20 of the frame, the arm 62 extending substantially tangentially of the driven disk 48 so as to engage the lever 58 when the driven disk 48 is rotated into the position indicated in Figures 2 and 5, and also in Figure 7. The arm 62 is limited in its movement about its pivotal connection 64 by a headed pin 68 which is inserted through an elongated arcuate slot 70 in the arm 62, as best illustrated in Figure 7. However, a latch assembly for the arm 62 is provided, this assembly including a latch bolt 72 which is biased into the position indicated in Figures 2, 5 and 7 by a spring 74 secured under tension between a short arm 76 depending from the latch bolt 72 and a small bracket 78 on the under side of the block 66, the latch bolt in this position holding the arm 62 against pivoting upwardly, so that the lever 58 is urged by cam action into the position best indicated in Figure 5, thus disengaging the driven disk 48 from the driving disk 46.

The latch bolt 72 is withdrawn by a solenoid 78, the armature of which is operatively connected with the latch bolt 72. The simple electrical circuit for control of the solenoid 78 includes the electrical leads 80 which connect the solenoid 78 in series with a source of electric power, indicated at 82, and fixed switch contacts 84 mounted on the sub-frame 28 adjacent the moving end contacts 86 of the plant-operated switch actuator or trigger 88. The switch actuator or trigger 88 is illustrated as comprised of a U-shaped wire pivoted near each end, as indicated at 90, on the sub-frame 28, it being understood that the moving contacts 86 are, in a simple form of this invention, merely the terminals of the U-shaped wire actuator 88. It will be understood that when the actuator 88 contacts the leaves of a plant 18, the resultant movement of the actuator 88 shifts the movable contacts 86 into engagement with fixed contacts 84 to close the circuit through the solenoid 78.

The driven disk 48 has an upwardly extending spindle 92 rigidly secured on the upper surface of the driven disk and disposed eccentrically thereof. The spindle 92 is engaged in an elongated slot 94 in a rigid elongated member 96 which is pivoted at one end to the said upright beam 24, as indicated at 98, while the other end of the member 96 is pivotally mounted, as indicated at 100, to an intermediate portion of an angle bar 102. In this connection, it should be carefully noted that the member 96 has an elongated slot 101, illustrated best in Figure 4, to receive the pivot pin indicated at 100. The angle bar 102 is illustrated as being circular in cross-section throughout the greater portion of its length, and an upper horizontal portion 103 of this angle bar 102 is slidably mounted in a sleeve bearing 104 rigidly mounted on the angle member 20. The intermediate portion of the angle bar 102 is vertical and another horizontal portion 105 of the angle bar extends from the lower end of the vertical portion in a direction opposite to the upper horizontal portion 103, the bar 102 being also rigidly secured to a sleeve bearing 106 which slides upon the bar 32 between the elements 30 and 34. The lower horizontal portion 105 of the angle bar 102 carries the earth-working tool 108 which is of U-shape, the ends being inserted vertically to the portion 105 and secured in place by nuts 110. The distance that the pivot pin 100 and the angle bar 102 with the earth-working tool 108 travels reciprocatively is sufficient to move the earth-working tool 108 into and out of line with the plants 18, and the earth-working tool 108 is, in one position thereof, directly behind the switch actuator or trigger 88, while in a second position this earth-working tool 108 is disposed laterally of the actuator or trigger 88.

The operation of this invention will be clearly understood from a consideration of the foregoing description of the mechanical details thereof, taken in connection with the above recited objects and the drawings. In recapitulation, it may be added that the cultivator may be raised and lowered at the option of the operator by means of the implement lift diagrammatically indicated at 12. The power take-off 16 is used, as already described, to drive the gears 38 and 40 and to drive the driving disk 46 at all times. When the disk has made a revolution into the position indicated in Figure 2, for example, the arm 62 will have acted as a cam to bias the lever 58 into the position indicated in Figure 2, causing the locking pin 50 to be raised out of engagement with the notches or teeth 52 in the driving disk 46. However, when the actuator or trigger 88 engages a plant 18, the circuit to the solenoid 78 will be completed and the latch bar 72 will be withdrawn so that the arm 62 may rise as a result of the action of the leaf spring 54. The locking pin 50 engages one of the notches 52 and the driven disk 48 is rotated to move the spindle 92 and the parts operated thereby, including the earth-working tool 108, into the position indicated in Figure 3, when cultivation or thinning of the row will be interrupted and the plant 18 will be by-passed.

An electric switch 112 is mounted on the tractor and the electrical leads 80 may be disconnected from the fixed contacts 84 and connected in series with the switch 112. This switch is controlled by the operator's hand or foot to open and close the circuit through the solenoid 78, so that the machine may be used where large weeds would otherwise actuate the trigger 86 and cause retraction of the tool 108. The use of the switch 112 also facilitates employment of the machine in plant thinning operations in an obvious manner.

Having described the invention, what is claimed as new is:

1. A cultivator comprising a frame, a bar slidably mounted for laterally reciprocating movement on said frame, an earth-working tool carried by said bar, an electric switch having a switch actuator operated on contact with a plant, and means carried by said frame to move said bar when said switch is closed comprising a continuously rotating element and means for connecting said bar to said element when the switch is closed, said continuously rotating element consisting of a driving disk, said connecting means including a driven disk mounted coaxially with the driving disk and connected with said bar, and a releasable driving connection between said disks to operate in response to plant contact by the switch actuator.

2. A cultivator comprising a frame, a bar slidably mounted for laterally reciprocating movement on said frame, an earth-working tool carried by said bar, an electric switch having a switch actuator operated on contact with a plant, and means to move said bar when said switch is closed, said means comprising a continuously rotating driving disk, a driven disk mounted coaxially with the driving disk and adapted to be drivingly connected therewith in response to plant contact by the switch actuator, a spindle mounted eccentrically on said driven disk, a centrally slotted member pivoted at its ends to said bar and frame, the slotted portion of said member being slidably engaged by said spindle to move the bar upon rotation of the driven disk.

3. A cultivator comprising a frame, a bar slidably mounted for laterally reciprocating movement on said frame, an earth-working tool carried by said bar, an electric switch having a switch actuator operated on contact with a plant, and means to move said bar when said switch is closed, said means comprising a continuously rotating driving disk, a driven disk mounted coaxially with the driving disk, a spindle mounted eccentrically on said driven disk, a centrally slotted member pivoted at its ends to said bar and frame, the slotted portion of said member being slidably engaged by said spindle, and electrically actuated means carried by said frame to selectively connect said driving and driven disks in response to plant contact by said switch actuator.

4. The combination of claim 3 and wherein said electrically actuated means includes a spring-pressed locking pin carried by said driven disk and projectable into engagement with the driving disk, a lever carrying said pin, an arm carried by the frame, a latch holding said arm in position to engage and to urge said lever into pin-withdrawing position when said driven disk is rotated to a given position, a solenoid operatively connected with said latch, said switch being connected in series with said solenoid so that closure of the switch releases said latch allowing said pin to engage the driving disk.

5. A cultivator comprising a frame, a bar slidably mounted for laterally reciprocating movement on said frame, earth working tools carried by said bar, an electric switch, a plant operated switch actuator for closing said switch mounted on said frame forwardly of and in the path of movement of said earth working tools, and means for sliding said bar out of its normal path of movement upon plant contact of the switch actuator, said means including a continuously rotating driving element carried by said frame, a normally inert driven element carried by said frame adjacent said driving element, a releasable driving connection connecting said driven and driving elements upon closing of said switch, and means interconnecting said bar and said driven element to slide said bar upon movement of the driven element.

6. A cultivator comprising a frame, a bar slidably mounted for laterally reciprocating movement on said frame, an earth-working tool carried by said bar, an electric switch having a switch actuator operated on contact with a plant, and means carried by said frame to move said bar when said switch is closed comprising a continuously rotating element and means for connecting said bar to said element when the switch is closed, said continuously rotating element consisting of a driving disk, said connecting means including a driven disk mounted coaxially with the driving disk and connected with said bar, and a releasable driving connection between said disks to operate in response to plant contact by the switch actuator, said driving connection comprising a spring-pressed locking pin carried by said driven disk and projectable into engagement with the driving disk, a lever carrying said pin, an arm, a latch holding said arm in position to engage and to urge said lever into pin-withdrawing position when said driven disk is rotated to a given position, a solenoid operatively connected with said latch, said switch being connected in series with said solenoid so that closure of the switch releases said latch allowing said pin to engage the driving disk.

IRA MYER.

References Cited in the file of this patent

UNITED STATES PATENTS

| Number | Name | Date |
| --- | --- | --- |
| 886,179 | Bragunier et al. | Apr. 28, 1908 |
| 1,589,249 | Sharpe et al. | June 15, 1926 |
| 2,400,562 | Marihart | May 21, 1946 |
| 2,563,326 | Ferguson | Aug. 7, 1951 |